(12) United States Patent
McGovern et al.

(10) Patent No.: US 7,746,279 B2
(45) Date of Patent: Jun. 29, 2010

(54) COMPOSITE STRUCTURES WITH INTEGRAL INTELLIGENT SKIN

(75) Inventors: Thomas R. McGovern, Escondido, CA (US); Ronald N. Hubbard, Encinitas, CA (US)

(73) Assignee: General Atomics, San Diego, CA (US)

(*) Notice: Subject to any disclaimer, the term of this patent is extended or adjusted under 35 U.S.C. 154(b) by 0 days.

(21) Appl. No.: 12/419,833

(22) Filed: Apr. 7, 2009

(65) Prior Publication Data

US 2009/0189307 A1 Jul. 30, 2009

Related U.S. Application Data

(62) Division of application No. 11/448,284, filed on Jun. 7, 2006, now abandoned.

(51) Int. Cl.
*H01Q 1/38* (2006.01)
*H01Q 1/28* (2006.01)
*H01Q 1/32* (2006.01)

(52) U.S. Cl. .............................. 343/700 MS; 343/705; 343/711

(58) Field of Classification Search .......... 343/700 MS, 343/705, 711
See application file for complete search history.

(56) References Cited

U.S. PATENT DOCUMENTS

| 5,956,175 | A | 9/1999 | Hojnowski |
| 6,060,811 | A * | 5/2000 | Fox et al. ..................... 310/311 |
| 7,188,498 | B2 * | 3/2007 | Browne et al. ................. 72/62 |
| 7,501,069 | B2 * | 3/2009 | Liu et al. ........................ 216/2 |
| 2007/0138010 | A1 | 6/2007 | Ajayan |

* cited by examiner

*Primary Examiner*—Shih-Chao Chen
(74) *Attorney, Agent, or Firm*—Greer, Burns & Crain, Ltd.

(57) ABSTRACT

Composite structures having an integral intelligent skin are made of one or more plies of a structural base material and an intelligent or smart film by molding one or more plies and the film into an integral unitary body with the intelligent film outermost. The intelligent or smart film contains or bears a functionally active or interactive component such as antennae, electronic sensors, electric and/or electronic circuitry, and/or spectrally tailored coatings. A method of making the composite structure in a very economical manner is disclosed.

13 Claims, 2 Drawing Sheets

COMPOSITE STRUCTURES WITH INTEGRAL INTELLIGENT SKIN

This application is a divisional of U.S. application Ser. No. 11/448,284, filed Jun. 7, 2006.

FIELD OF THE INVENTION

The present invention relates to molded structures having an outer surface comprised of or bearing a functionally active or interactive component, such as antennae, electronic sensors and/or spectral control coatings, and to a weight and cost saving method of making the same.

BACKGROUND

Spectral control coatings, for example, are conventionally applied to substrates, such as the outer surfaces of military and other installations, vehicles, watercraft and air and space craft by applying an appropriately treated paint to the surfaces or by adhering appropriately treated flexible films to the surfaces.

Application of existing topcoats to substrates, whether paints or films, is time consuming and labor intensive and therefore expensive. In many cases, the cost of application is far greater than the cost of the coating itself. Also, existing paints and films have a tendency to wear or peel off the surfaces to which they are applied, thus necessitating re-application of the paint or film, at further expense.

SUMMARY OF THE INVENTION

An object of the invention is to provide a more effective, practical and economical mode of affixing topcoats and paint replacement films to substrates.

Another object of the invention is to integrate the topcoat with the substrate to mitigate peeling and to increase service life.

A further object of the invention is to provide for integration into molded structures of flexible films incorporating active and interactive devices, such for example as signal sending and receiving devices and antennae, electrical and electronic circuitry and/or sensors, and flexible electronics, as well as spectrally controlled treated films, all of which are referred to herein as "smart films and skins" and "intelligent films and skins".

In accordance with the invention, a smart or intelligent film is integrally molded into a composite structure during manufacture of the structure, e.g., a component part of a military vehicle or craft.

The composite structure is comprised of one or more plies of a structural base material, for example, graphite fibers dispersed in a resin matrix, which are laid up in a mold together with a smart or intelligent film so oriented as to constitute an outer surface or skin of the structure, i.e., with the film comprising the first layer in the mold. If the smart film has a smart surface, e.g., a spectral control coating, the smart surface faces the bottom of the mold.

The composite is then processed normally, usually at elevated temperature and controlled pressure, to produce a cured composite structure having an integral, wear resistant intelligent skin.

The foregoing and other objects and advantages of the invention will become apparent to those of reasonable skill in the art from the following detailed description, as considered in conjunction with the accompanying drawings.

DETAILED DESCRIPTION OF PREFERRED EMBODIMENTS

The following is a detailed description of certain embodiments of the invention presently contemplated by the inventors to be the best mode of carrying out their invention.

Figure 1:
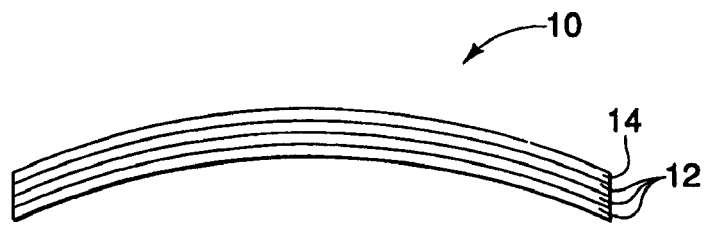
FIG. 1 is a cross sectional view of an illustrative composite structure made in accordance with the invention.

Referring to FIG. 1, an integrated composite structure 10 made in accordance with the invention is comprised of one or more plies 12 of a moldable structural base material and a smart or intelligent film 14 comprising an outer surface of the structure. The structure shown is merely illustrative of a variety of products that can be made in accordance with the invention. For example, the composite structure 10 could comprise a component, say a wing, for a drone (pilotless) aircraft used for surveillance. The craft may require spectral control to shield it from detection; electric and/or electronic circuitry for controlling the craft and transmitting data; antennae for sending and receiving signals, etc. One or more of these representative functions, and others as well, can be incorporated in the intelligent film 14.

In one embodiment of the invention, the plies 12 comprise graphite fibers dispersed in a moldable resin matrix and the film 14 comprises a flexible polymer substrate bearing one or more coatings or layers of materials tailored for controlling the spectral properties of the outer surface of the structure 10. A scratch, abrasion and wear resistant coating may be applied over the spectral control coating. The substrate and coatings are generally known in the art. See, e.g., U.S. Pat. No. 5,956,175 and the references therein cited. The substrate is usually obtained in roll form; unrolled and passed as a continuous web through a vacuum chamber where a single or multilayer coating is applied to the web; and re-rolling the web for subsequent use.

Figure 4:
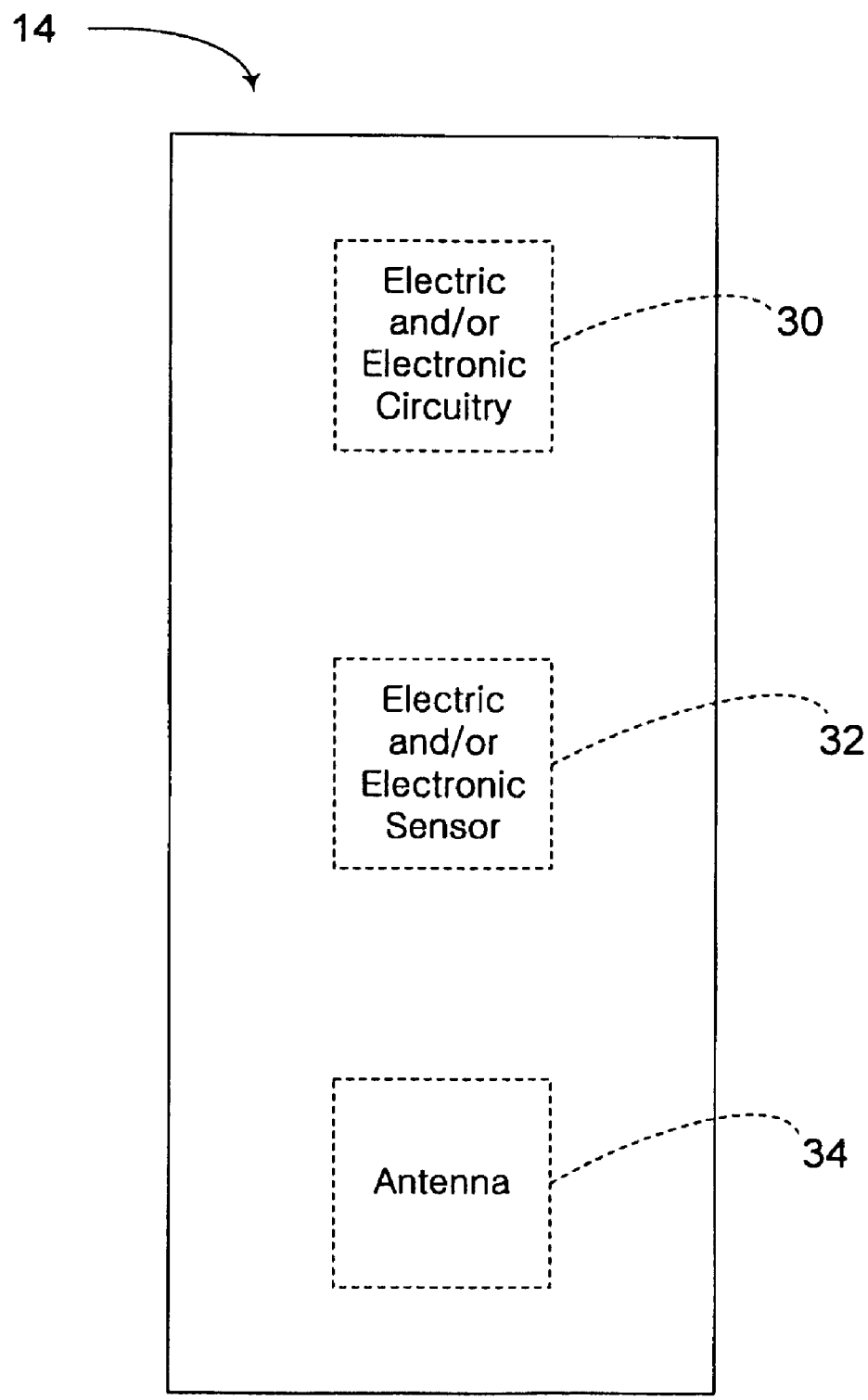
FIG. 4 is a block diagram of an intelligent film for use in the composite structure of FIG. 1.

Referring to FIG. 4, a block diagram of the intelligent film 14 is shown. The intelligent film may include one or more electronic devices, such as electric and/or electronic circuits, electric and/or electronic sensors, and antennas. That is, while the illustrated intelligent film 14 shown in FIG. 4 incorporates electric and/or electronic circuitry 30, an electric and/or electronic sensor 32, and an antenna 34, it is contemplated that the intelligent film may incorporate more or fewer of these devices in any combination, as well as including additional or different devices.

In accordance with the present invention, the coated substrate, which now comprises a smart or intelligent film 14, and one or more plies 12 of structural base material are cut to the size required for the structure 10 and laid up in a mold with the film 14 oriented to constitute an outer surface of the structure 10.

Figure 2:
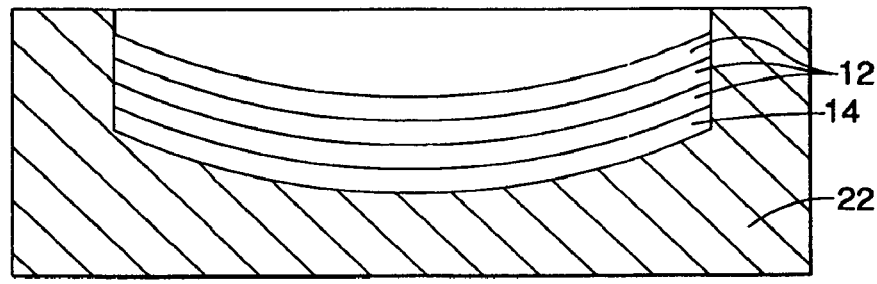
FIG. 2 is a cross sectional view of a mold part for making the structure of FIG. 1 and illustrating the sequence of application to the mold of the constituents of the structure of FIG. 1.
Figure 3:
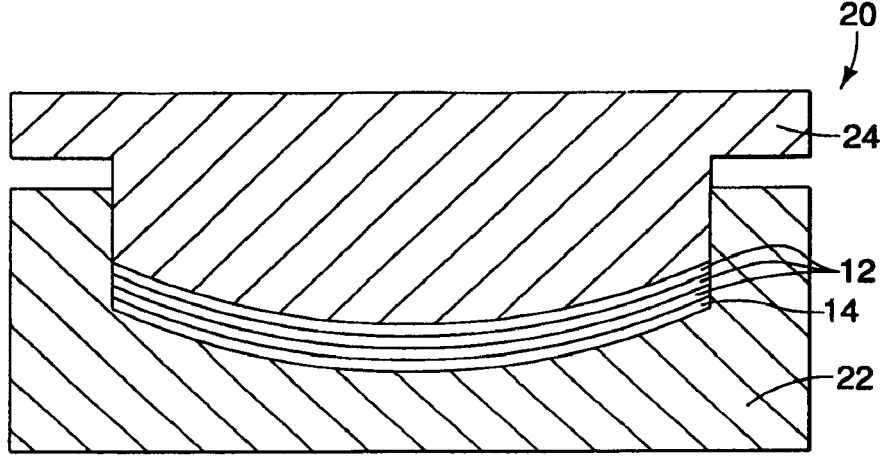
FIG. 3 is a cross sectional view of two mold parts employed for making the structure of FIG. 1 and showing the mold parts in molding position.

Referring to FIGS. 2 and 3, a representative mold 20 for molding the structure 10 is comprised of a lower mold part 22 having a cavity of a size and shape to form the outer surface of the structure 10 and an upper mold part 24 having a protrusion complementary to the cavity for forming the other surface of the structure 10.

The cut and sized intelligent film 14 is laid in the cavity first. In embodiments of the invention in which the active component is coated onto a substrate, such as the above-described spectral control coating, the film 14 is laid in the mold with the active surface facing the bottom of the mold cavity. The cut and sized ply or plies 12 of structural material are then laid up on top of the film 14.

After the film 14 and plies 12 have been laid up in the mold cavity as illustrated in FIG. 2, the upper mold part 24 is aligned with the lower mold part 22 as illustrated in FIG. 3, and the two mold parts are heated to an elevated temperature and pressed toward one another at a reduced pressure, i.e., in a vacuum, for a period of time necessary to form, cure and integrate the plies 12 and film 14.

For the spectrally tailored control embodiment of the invention above described, suitable conditions for forming and curing the structure 10 are a mold temperature within the range of from about 140 to about 150° F.; a vacuum pressure within the range of from about 20 to about 28 inches of mercury ("Hg), and a time duration within the range from about 16 to about 24 hours. The structure is then removed from the mold and cleaned normally.

The method of the present invention is more convenient, practical and economical than the prior art modes of application of paints and films to base structures. Also, the integral smart film can provide significantly higher performance at less weight than paints and most prior art films.

The present invention thus provides an improved and highly durable integrally molded composite structure having an integral intelligent skin and a method of making such structure in a convenient, practical and extremely economical manner.

While preferred embodiments of the invention have been herein illustrated and described, it is to be appreciated that various changes, re-arrangements and modification may be made therein without departing from the scope of the invention as defined by the appended claims.

What is claimed is:

1. A method of making a composite structure with an integral intelligent skin comprising the steps of
   providing a mold,
   providing one or more plies of a structural base material,
   providing an intelligent film,
   laying the one or more plies and the film in the mold with the film so oriented as to constitute an outer surface of the structure,
   molding the one or more plies and the film to form a molded composite structure having an integral intelligent skin, and
   removing the composite structure from the mold.

2. A method as set forth in claim 1 wherein the mold includes an upwardly facing cavity and the one or more plies and the film are laid in the cavity with the film lowermost.

3. A method as set forth in claim 1 wherein one or more of the plies comprises graphite fibers in a resin matrix.

4. A method as set forth in claim 1 wherein the film is spectrally tailored.

5. A method as set forth in claim 1 wherein the film incorporates electric and/or electronic circuitry.

6. A method as set forth in claim 1 wherein the film incorporates electric and/or electronic sensors.

7. A method as set forth in claim 1 wherein the film incorporates means for receiving and/or transmitting signals.

8. A method as set forth in claim 1 wherein the film comprises an antenna.

9. A method as set forth in claim 1 wherein the film has an active surface and the one or more plies and the film are laid in the mold with the film so oriented that the active surface of the film constitutes the outer surface of the structure.

10. A method as set forth in claim 1 wherein the molding step is carried out at elevated temperature and reduced pressure.

11. A method as set forth in claim 10 wherein the molding step is carried out at a temperature of from about 140 to about 150° F. and at a pressure of from about 20 to about 28 "Hg.

12. A method as set forth in claim 11 wherein the duration of the molding step is from about 16 to about 24 hours.

13. A method of making a composite structure with an integral intelligent skin comprising the steps of
   providing a mold,
   providing one or more plies of a structural base material,
   providing an intelligent film,
   laying the one or more plies and the film in the mold with the film so oriented as to constitute an outer surface of the structure,
   molding the one or more plies and the film to form a molded composite structure having an integral intelligent skin, and
   removing the composite structure from the mold,
   wherein the intelligent film incorporates one or more electronic devices.

* * * * *